United States Patent [19]

Kassai

[11] Patent Number: 4,586,399
[45] Date of Patent: May 6, 1986

[54] HANDCART HANDLE HEIGHT ADJUSTING MECHANISM

[75] Inventor: Kenzou Kassai, Osaka, Japan

[73] Assignee: Aprica Kassai Kabushikikaisha, Osaka, Japan

[21] Appl. No.: 659,668

[22] Filed: Oct. 11, 1984

[30] Foreign Application Priority Data

Nov. 4, 1983 [JP] Japan .......................... 58-171762[U]

[51] Int. Cl.$^4$ ...................... B62K 21/16; B62B 7/12; F16B 7/10
[52] U.S. Cl. ................................ 74/551.3; 24/541; 280/47.37 R; 403/330; 403/108
[58] Field of Search ................... 74/551.3, 525, 551.7; 403/330, 316, 108; 280/47.37 R; 24/541; 5/101–105

[56] References Cited

U.S. PATENT DOCUMENTS

| | | | |
|---|---|---|---|
| 627,351 | 6/1899 | Raymond | 74/551.3 X |
| 846,389 | 3/1907 | Blackburn | 403/108 |
| 1,954,048 | 4/1934 | Jeffrey et al. | 403/330 X |
| 3,026,592 | 3/1962 | Dudley | 24/541 |
| 4,412,689 | 11/1983 | Lee | 280/47.37 R |

Primary Examiner—Kenneth J. Dorner
Assistant Examiner—Vinh Luong
Attorney, Agent, or Firm—W. G. Fasse; D. H. Kane, Jr.

[57] ABSTRACT

A handle height adjusting mechanism includes a handle with an upper rod portion having a grip, and a lower rod portion for slidably supporting the upper rod portion. The upper rod portion has a lever turnably attached thereto. The lever has an engaging projection adapted to fit into engaging holes of the lower rod portion. The lever is constantly urged by springs in a direction which allows the engaging projection to fit in any one of the engaging holes. The upper rod portion has a stopper turnably attached thereto preventing a cancellation of the engagement between the engaging projection and an engaging hole. The stopper has a presser portion, and brake portions for contacting the lower rod portion when the presser portion covers the lever, so as to stop the turning movement of the stopper. Thus, when the engaging projection is in engagement with an engaging hole, the turning movement of the lever is inhibited and hence the engagement between the engaging projection and the engaging hole cannot be canceled.

1 Claim, 5 Drawing Figures

HANDCART HANDLE HEIGHT ADJUSTING MECHANISM

BACKGROUND OF THE INVENTION

1. Field of the Invention

This invention relates to a mechanism for adjusting the height of the handle of a handcart.

2. Description of the Prior Art

Handcarts, such as baby carriages and load carrying vehicles, are provided with a handle for the pusher to push them by hand. Generally, this handle is fixed to the handcart body and its height cannot be adjusted. As a result, there have been various inconveniences.

That is, some of the persons who push handcarts are tall and others are short. These persons will feel it very inconvenient that the height of the handle cannot be changed.

SUMMARY OF THE INVENTION

Accordingly, an object of this invention is to provide a mechanism enabling the height of the handle of a handcart to be adjusted with ease.

According to this invention, the handle of a handcart comprises an upper rod portion having a grip, and a lower rod portion for vertically slidably supporting said upper rod portion. Either of the upper and lower rod portions forms a sleeve and the other forms an insert adapted to be received from one end of said sleeve. The insert is formed with a plurality of vertically aligned engaging holes. In connection therewith, the sleeve has a lever turnably attached thereto which has an engaging projection adapted to fit in said engaging holes. The lever is constantly urged by a spring to turn in a direction which allows the engaging projection to fit in said engaging holes. Further, a stopper is turnably attached to the sleeve to prevent the engaging projection from being disengaged from the engaging hole. This stopper has a presser portion having a sufficient area to cover at least part of said lever when the stopper is in predetermined positional relation to said lever, and a brake portion extending outwardly of the axis of rotation of said stopper and adapted to contact with the insert when the presser portion covers at least part of the lever, to thereby stop the turning of said stopper. Therefore, when the engaging projection is engaged with one of the engaging holes, the turning movement of the lever is inhibited and hence the engagement between the engaging projection and the engaging hole is not canceled.

As described above, according to this invention, the handle to be pushed by hand comprises a sleeve, and an insert adapted to be slidably received in said sleeve, and since the engaging projection on the lever attached to the sleeve can be engaged at a suitable position with the engaging holes formed in the insert, the height of the handle can be adjusted according to the stature of the person who pushes the handcart. Further, because of the arrangement adapted to firmly hold the engagement between the engaging projection and the engaging hole, it is possible to avoid a situation in which the engagement between the engaging projection and the engaging hole is canceled by an accidental operation, for example.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
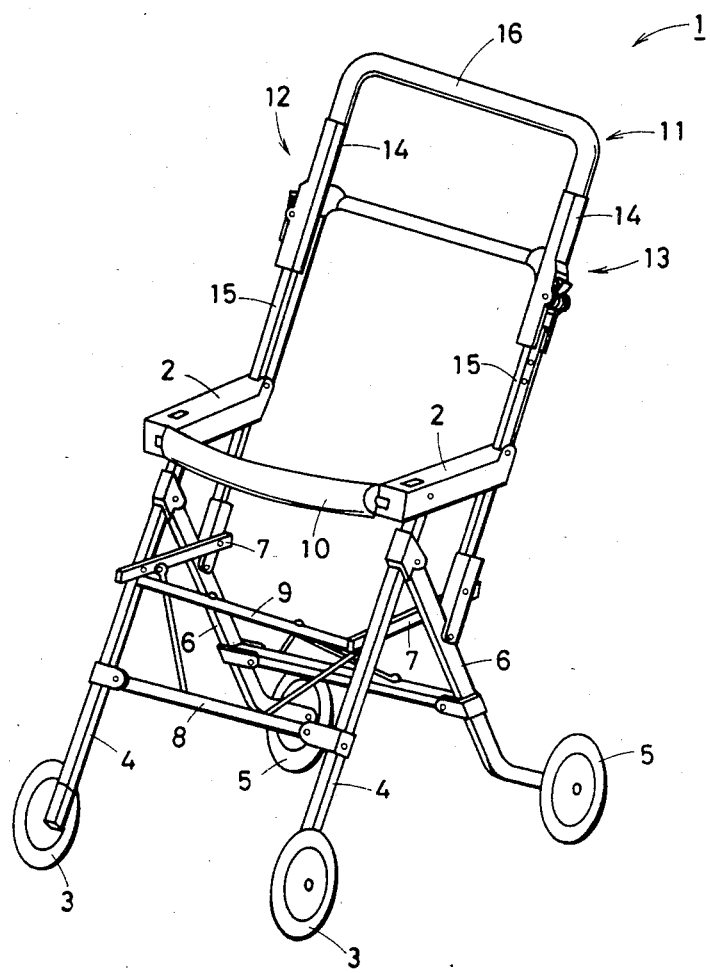
FIG. 1 is a perspective view of one embodiment of a handle height adjusting mechanism in a baby carriage.

Referring to FIG. 1, a baby carriage 1 comprises a handcart 2, front legs 4 each having a front wheel 3, rear legs 6 each having a rear wheel 5, seat support rods 7 for supporting a seat, connecting members 8, 9, and 10 for interconnecting right and left members, and a push rod, i.e., handle 11 connected at its lower end to the rear legs 6. The handle 11 is used when the baby carriage 1 is to be moved. This invention relates to a mechanism for adjusting the height of this handle.

The handle 11, in this embodiment, has an inverted U-shape for example, but is not limited to this shape. The handle includes mechanisms for adjusting the height of the handle. Such mechanism is installed on the right-hand and left-hand sides as shown by the reference numerals 12 and 13. The mechanism 12 on the right-hand side is the same in its basic arrangement and also in its operation as the mechanism 13 on the left-hand side. Thus, the following description is given using the right-hand side mechanism 12.

Figure 2:
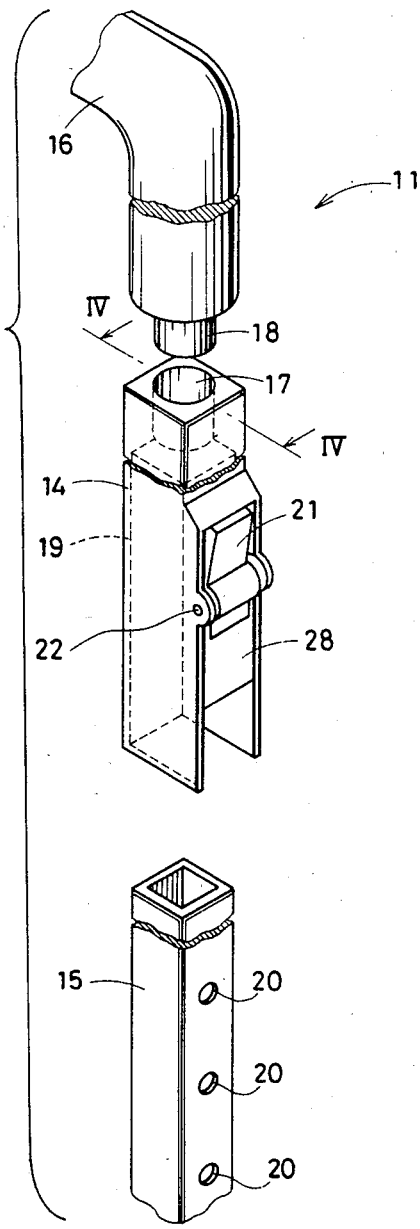
FIG. 2 is a perspective view showing the principal portions of this invention in disassembled condition.

Referring to FIGS. 1 and 2, the handle 11 comprises upper rod portions 14 and lower rod portions 15. The upper rod portions 14 have a grip 16 to be gripped by the person who pushes the baby carriage. The upper rod portions 14 and the grip 16 may be fixed together. Alternatively, they may be constructed as follows: The upper end of each upper rod portion 14 is formed with a circular opening 17, while the lower end of the grip 16 is formed with a circular projection 18. Thus, by engaging the opening 17 and the projection 18 with each other, the grip 16 can be attached to the upper rod portion 14. In addition, if the grip 16 is collapsible, the same arrangement may be supplemented with a design which allows the projection 18 to turn inside the opening 17.

The lower rod portion 15 supports the upper rod portion 14 for vertical slide movement. More particularly, the upper rod portion 14 forms a sleeve internally having an opening 19, while the lower rod portion 15 forms an insert adapted to be slidably received in said opening 19 from one end of the upper rod portion 14.

Figure 3:
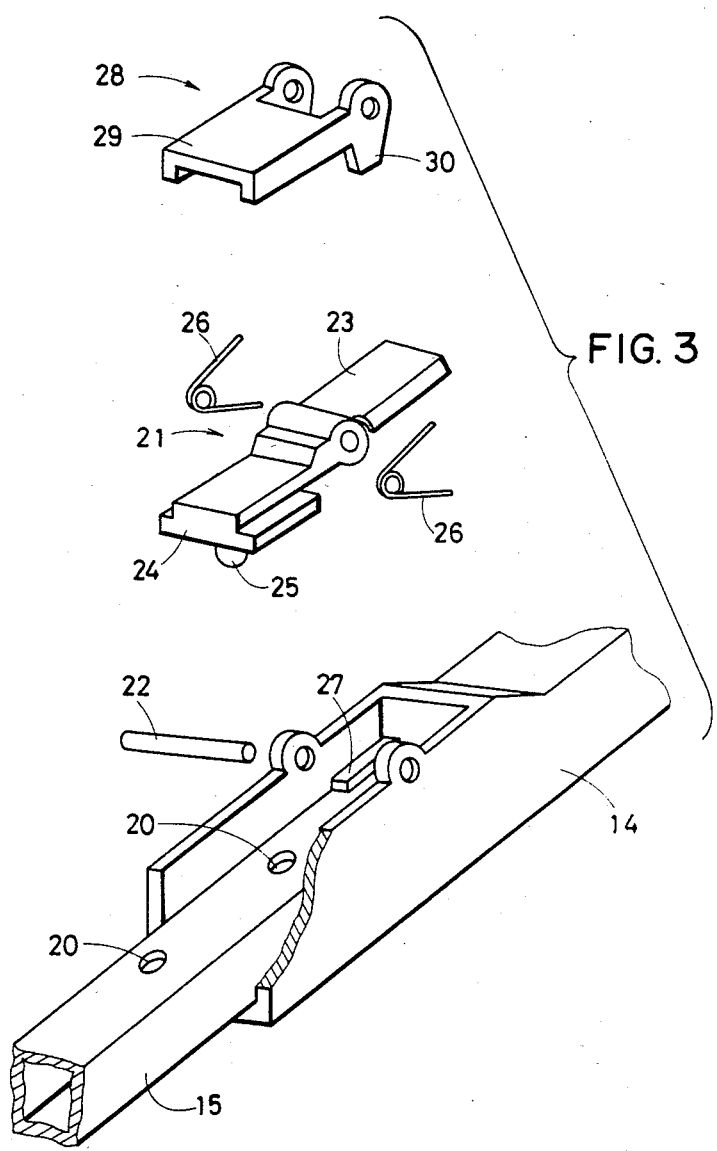
FIG. 3 is a perspective view of parts to be attached to an upper rod portion shown in FIG. 2, said parts being shown in a disassembled condition to clarify the arrangement of said upper rod portion.
Figure 4:
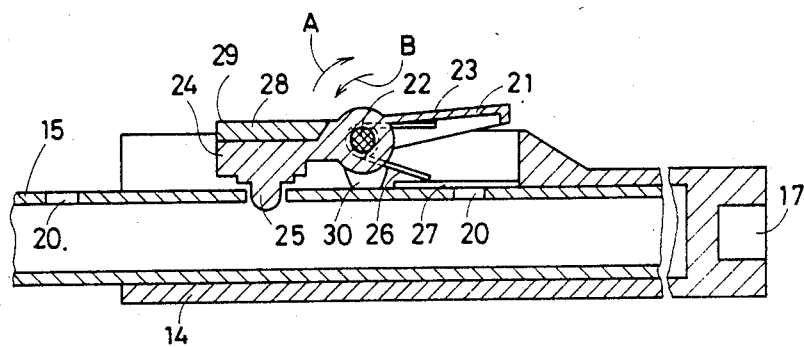
FIG. 4 is a sectional view taken along the line IV—IV of FIG. 2.

Referring to FIGS. 2 to 4, the lower rod portion 15 is formed with a plurality of vertically aligned engaging holes 20. In connection therewith, the upper rod portion 14 has a lever 21 turnably attached thereto through a pin 22. The lever 21 has on the upper side of the axis of rotation thereof an operating portion 23 for turning the lever, and on the lower side a locking portion 24. The lower surface of the locking portion 24 is provided with an engaging projection 25 adapted to fit in the engaging holes 20 of the lower rod portion 15. And the lever 21 is constantly urged by springs to turn in a direction which causes the engaging projection 25 to fit in the engaging holes 20. Examples of springs to be used are kick springs 26. The kick springs 26 are attached to the pin 22, with one of their respective ends abutting against the operating portion 23 of the lever 21 and with the other ends abutting against spring seats 27 provided on the outer surface of the lower rod portion 15 or on the inner surface of the upper rod portion 14. The other ends of the kick springs 26 may be directly contacted with the lower rod portion 15, but when the relative slide movement between the upper and lower rod portions 14 and 15 is considered, it is preferably to provide spring seats 27.

Further, the upper rod portion 14 is provide with a stopper 28 for preventing cancellation of the engagement between the engaging projection 25 on the lever 21 and the engaging holes 20 of the lower rod portion 15, said stopper being turnably attached thereto through the same pin 22 that is used when attaching the lever 21. The stopper 28, as shown in FIG. 3, has a presser portion 29 and a brake portion 30. The presser portion 29 has a sufficient area to cover at least part of the lever 21 when the stopper 28 is in a predetermined positional relation to the lever 21. More particularly, when the lever 21 is turned until its engaging projection 25 fits in an engaging hole 20 of the lower rod portion 15 and when the stopper 28 is also turned in a predetermined direction in this embodiment in the same direction in which the lever 21 is turned, the presser portion 29 of the stopper 28 abuts against the upper surface of the locking portion 24 of the lever 21 to cover it. Further, the brake portions 30 are formed so that they extend outwardly of the axis of rotation of the stopper 28. The relative positional relation of the brake portions 30, of the lever 21, and of the upper portion 14 will now be described briefly. First, the brake portions 30, i.e., the stopper 28, are located adjacent the inner side of the upper rod portion 14, and the lever 21 is positioned adjacent the inner side of the brake portions 30. When the stopper 28 and the lever 21 are in predetermined positional relation, i.e., when the engagement between the engaging projection 25 and the engaging hole 20 is followed by the turning of the stopper 28 until the presser portion 29 covers the locking portion 24 of the lever 21, the brake portions 30 contact the outer surface of the lower rod portion 15 to thereby stop the turning of the stopper 28. Therefore, turning the stopper 28 from the FIG. 4 state in the direction of arrow A requires some force.

The state shown in FIG. 4 will now be described in more detail. Prior to this state, the upper rod portion 14 has been slid along the lower rod portion 15 to a suitable position to provide a suitable handle height. At said position, the further sliding movement is inhibited by the engagement between the engaging projection 25 on the lever 21 and the engaging hole 20 of the lower rod portion 15, whereby the height of the handle is fixed. Since the lever 21 is constantly urged by the action of the kick springs 26 to turn in the direction of arrow B, as described above, the engagement between the engaging projection 25 and the engaging hole 20 is maintained with some degree of firmness. However, the hands of the person who pushes the baby carriage may accidentally contact the operating portion 23 of the stopper 28, resulting in canceling the engagement between the engaging projection 25 and the engaging hole 20. Thus, it is desirable to ensure that the engagement between the engaging projection 25 and engaging hole 20 cannot be canceled too easily. It is the stopper 28 that functions for this purpose. The stopper 28, in the state shown in FIG. 4, has its brake portions 30 contacted with the lower rod portion 15, so that it is inhibited from turning in the direction of arrow A. At this time, since the presser portion 29 of the stopper 28 covers the upper side of the locking portion 24 of the lever 21, the turning movement of the lever 21 in the direction of arrow A is also inhibited. In this manner, the lever 21 is urged by the kick springs 26 and is held down by the stopper 21, so that it follows that the engagement between the engaging projection 25 and the engaging hole 20 is maintained more firmly.

Figure 5:
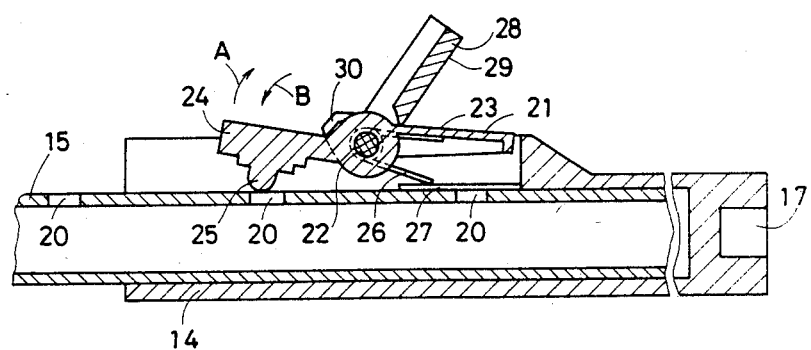
FIG. 5 is a view similar to FIG. 4 but showing the state allowing the upper rod portion to slide on the lower rod portion.

FIG. 5 shows the state in which the engaging projection 25 and engaging hole 20 are disengaged from each other. FIGS. 4 and 5 illustrate a shift from the state shown in FIG. 4 to the state shown in FIG. 5. First, the stopper 28 is operated by hand with more than a predetermined force to turn the stopper 28 in the direction of arrow A, whereby the presser action of the presser portion 29 of the stopper 28 disappears, thereby allowing the lever 21 to be turned by the operating portion 23. That is, as shown in FIG. 5, the engagement between the engaging projection 25 and the engaging hole 20 can be canceled by pressing the operating portion 23 to turn the locking portion 24 in the direction of arrow A. In addition, in turning the lever 21, the operating portion 23 of the lever 21 may be pressed directly by hand, but it may be done through the stopper 28, whereby the stopper 28 is operated for turning in the direction of arrow A and this turning operation is continued even when the stopper 28 contacts the operating portion 23 of the lever 21, whereby the lever 21 is turned by the pressing force exerted by the stopper 28. This mode of operation is simpler and more convenient.

If simple operation is a factor to be taken into account, it is preferable to manually and strongly press the operating portion 23 of the lever 21 without touching the stopper 28 to thereby cancel the engagement between the engaging projection 25 and the engaging hole 20. In this case, the pressing force on the operating portion 23 must be high enough the overcome the brake force exerted by the stopper 28.

In the state shown in FIG. 5, the upper rod portion 14 is allowed to slide on the lower rod portion 15. Thus, when it is desired to change the height of the handle, the upper rod portion 14 is slid to a predetermined position with the lever 21 held in the state shown in FIG. 5. When the pressing force on the lever 21 is removed, the lever 21 is automatically turned under the action of the kick spring 26, whereby the engaging projection engages with the engaging hole 20. Thereafter, the stopper 28 is turned in the direction of arrow B to fix the engagement firmly. In this manner, the height of the handle can be easily adjusted.

The handle height adjusting mechanism described with reference to FIGS. 1 to 5 is an embodiment of this invention shown by way of example. Therefore, various changes or modifications are possible. A typical modification will now be described.

First, attention is given to the attaching position of the stopper 28. In the embodiment described above, the axis of rotation of the stopper 28 coincides with the axis of rotation of the lever 21. However, it is not always necessary for them to coincide with each other; the stopper 28 and the lever 21 may be installed at separate positions, although the arrangement of the illustrated embodiment provides the following advantages: First, since a single pin 22 is sufficient for turnably supporting the lever 21 and stopper 28 and since the lever 21 and stopper 28 can be installed at the same location, the construction of the handle height adjusting mechanism is more compact. Further, since the engagement between the engaging projection 25 and the engaging hole can be canceled simply by turning the stopper 28 and the lever 21 in the same direction, the turning operation is very simple.

In the illustrated embodiment, the presser portion 29 of the stopper 28 has been shown as having a sufficient area to cover the whole of the locking portion 24 of the lever 21. However, when its function is considered, it will be understood that it is only necessary for the presser portion 29 to have an area sufficient for covering at least part of the locking portion 24. If, however, the presser portion 29 has a substantial length, it is easier to ascertain whether the stopper 28 is in the state shown in FIG. 4 or in the state shown in FIG. 5. The ascertaining of the position of the stopper 28 is equivalent to the ascertaining of whether or not the engagement between the engaging projection 25 and the engaging hole 20 is locked.

In the embodiment described above, the upper rod portion 14 forms a sleeve, while the lower rod portion 15 forms an insert adapted to be received in the sleeve from one end thereof. However, this arrangement may be reversed. That is, the lower rod portion 15 may form a sleeve and the upper rod portion 14 may form an insert.

Further, a baby carriage has been shown as an example of a handcart to which the invention is applied. However, the type of the baby carriage is not limited to the illustrated one. For example, it may be a baby carriage of the type in which the grip 16 is made collapsible, as described above. Besides, examples of handcarts are not limited to baby carriages and include shopping carts and load carrying vehicles.

Although the present invention has been described and illustrated in detail, it is clearly understood that the same is by way of illustration and example only and is not to be taken by way of limitation, the scope of the present invention being limited only by the terms of the appended claims.

What is claimed is:

1. A mechanism for adjusting the height of a handle (11) of a handcart, comprising said handle (11), and including an upper rod portion (14) having a grip (16), and a lower rod portion (15) for vertically and slidably supporting the upper rod portion (14); one of said upper and lower rod portions (14, 15) forming a sleeve, while the respective other rod portion forms an insert adapted to be received with one insert end in said sleeve; said insert comprising a plurality of vertically aligned engaging holes (20); said sleeve having a lever (21) turnably attached to said sleeve, said lever having an engaging projection (25) adapted to fit in any one of said engaging holes (20); spring means (26) arranged for constantly urging said lever (21) in a direction which allows said engaging projection (25) to fit in any one of said engaging holes (20); said sleeve further comprising a stopper (28) turnably attached to said sleeve for preventing a cancellation of the engagement between said engaging projection (25) and a respective engaging hole (20); said stopper (28) comprising a presser portion (29) having an area sufficient in size for covering at least part of said lever (21) when said stopper (28) is in a predetermined positional relation to said lever (21), and brake portions (30) extending outwardly of an axis of rotation of said stopper (28) for contacting said insert when said presser portion (29) is covering at least part of said lever (21), so as to stop a turning movement of said stopper (28), whereby when said engaging projection is in engagement with a respective engaging hole, the turning movement of said lever (21) is inhibited and so that cancellation of the engagement between said engaging projection (25) and said engaging hole (20) is avoided.

* * * * *